United States Patent
Kim et al.

(10) Patent No.: US 7,546,611 B2
(45) Date of Patent: Jun. 9, 2009

(54) DRIVER AGENT DEVICE FOR SUPPORTING REMOTE DEVICE DRIVER DEVELOPMENT ENVIRONMENT IN EMBEDDED SYSTEM AND OPERATION METHOD THEREOF

(75) Inventors: Jeong Si Kim, Daejeon-shi (KR); Chae Deok Lim, Daejeon-shi (KR); Seung Min Park, Daejeon-shi (KR)

(73) Assignee: Elecronics and Telecommunications Research Institute, Daejeon-shi (KR)

( * ) Notice: Subject to any disclaimer, the term of this patent is extended or adjusted under 35 U.S.C. 154(b) by 819 days.

(21) Appl. No.: 11/008,996

(22) Filed: Dec. 13, 2004

(65) Prior Publication Data
US 2005/0143907 A1 Jun. 30, 2005

(30) Foreign Application Priority Data
Dec. 13, 2003 (KR) .................. 10-2003-0091016

(51) Int. Cl.
*G06F 3/00* (2006.01)
*G06F 9/44* (2006.01)
*G06F 9/46* (2006.01)
*G06F 13/00* (2006.01)
(52) U.S. Cl. .................................. 719/320; 717/103
(58) Field of Classification Search ................ 719/320, 719/330; 717/100–103; 710/8, 62; 709/201
See application file for complete search history.

(56) References Cited

U.S. PATENT DOCUMENTS

| 6,272,559 B1 * | 8/2001 | Jones et al. ................. 719/330 |
| 6,393,497 B1 * | 5/2002 | Arnold et al. ............... 719/330 |
| 6,487,607 B1 * | 11/2002 | Wollrath et al. ............ 719/330 |
| 6,892,299 B2 * | 5/2005 | Abe ............................... 713/2 |
| 7,210,148 B2 * | 4/2007 | Arnold et al. ............... 719/330 |
| 2002/0091874 A1 * | 7/2002 | Jones et al. ................. 709/330 |

FOREIGN PATENT DOCUMENTS

KR 10-2001-0038541 5/2001

* cited by examiner

*Primary Examiner*—Meng-Ai An
*Assistant Examiner*—Qing-Yuan Wu
(74) *Attorney, Agent, or Firm*—Lowe Hauptman Ham & Berner, LLP

(57) ABSTRACT

A host system having a device driver development tool and a target system having a device driver agent, the tool and the target system separated from each other and interconnected with a communication network. The driver agent device communicates with the target system, receiving and processing various service requests from the device driver development tool, and transmits the processed services to the host system through the communication network. Thr driver agent determines types of the services requested from the device driver development tool and performs services based on the types of the services determined. Accordingly, the device driver can be adapted to the target system and tested without complex procedures to effectively reduce time and manpower needed for the device driver development.

5 Claims, 6 Drawing Sheets

DRIVER AGENT DEVICE FOR SUPPORTING REMOTE DEVICE DRIVER DEVELOPMENT ENVIRONMENT IN EMBEDDED SYSTEM AND OPERATION METHOD THEREOF

CROSS-REFERENCE TO RELATED APPLICATION

This application claims priority to and the benefit of Korean Patent Application No. 2003-91016, filed on Dec. 13, 2003, the disclosure of which is incorporated herein by reference in its entirety.

BACKGROUND

1. Field of the Invention

The present invention relates to a driver agent device and a operation method thereof and, more specifically, to a driver agent device for supporting remote device driver development environment in an embedded system and an operation method thereof, in which a developer can process various services such as retrieving hardware information needed for device development, authenticating resources and applying a device driver to a target system, without expert knowledge on an embedded system in a Linux-operated embedded system.

2. Discussion of Related Art

Recently, an embedded system that had been used in a restricted field such as industry and military has widely used in medicals and consumer electronics. Therefore, much attention is paid to the rapid development of the embedded system by embedded system development industries to acquire a more market share.

A development process of the embedded system can be divided into a hardware development process and a software development process. The device driver development, which may be positioned between these two development processes, is widely known as a time-consuming process as a bottleneck point of the embedded system development process.

In particular, the device driver development environment for the embedded system having inevitably complicated remote development causes much more difficulty in the device driver development. In addition, there are various and unique functions of the embedded systems for each individual embedded system compared with a general computer system so that the used devices are also diversified and unique. Therefore, the costs spent for developing device drivers for these devices are inevitably high.

In addition, conventional technologies for supporting the device driver development have focused on the Window-based device driver development for a desktop system. In the conventional technologies, simple hardware authentication processing, device driver installation, and test processing are provided to support the development of the device driver operating in a given operating system in a negative development environment where a host system and a target system are not separated.

FIG. 1 is a schematic block diagram illustrating a device driver development environment using a device driver development support program according to the prior art.

As shown in FIG. 1, in the prior art, a device driver development support program 3 supporting a device driver development environment or a development tool 1 is provided to develop a device driver that operates in an operating system of a non-embedded system, where a host system and a target system are not separated, i.e., a development system 4.

However, the prior art arranged as described above has problems in that it requires version-dependent processing that depends on various kernel versions, and it is impossible to be used in the development of the device driver for a Linux embedded system in which a remote development environment is inevitable.

SUMMARY OF THE INVENTION

The present invention is directed to a driver agent device for supporting a remote device driver development environment in an embedded system, in which a developer can process various services such as retrieving hardware information needed for the development of the device driver, authenticating resources and applying a device driver to a target system, without expert knowledge on the embedded system in a Linux-operated embedded system.

The present invention is also directed to an operation method of a driver agent device for supporting a remote device driver development environment in an embedded system, which transmits various serves requested from a device driver development tool of a host system to a target system, determines types of the various services transmitted to the target system, processes the corresponding service depending on the type of the services, and then, transmits the processed service result to the host system.

One aspect of the present invention is to a driver agent device for supporting a remote device driver development environment in an embedded system, in which a host system having a device driver development tool and a target system having a device driver are separated from each other and interconnected with a communication network, the driver agent device comprising: communication processing means interconnected with the target system to receive and process various service requests from the device driver development tool of the host system, and to transmit the processed services to the host system through the communication network; core means for determining types of the services requested from the device driver development tool of the host system; and service processing means for performing corresponding services based on the types of the services determined by the core means.

In the above aspect, the service processing means includes: a device detection unit for detecting device catalog and information by scanning buses of the target system, in the case that the service determined by the core means is directed to detecting devices mounted on the target system; a device resource authentication unit for providing a read/write access function to the device resources, in the case that the service determined by the core means is directed to authenticating the device resources of the target system; a kernel device information extraction unit for extracting information retained in a device related data structure of the kernel, in the case that the service determined by the core means is directed to requesting kernel information on the devices of the target system, a kernel message detection unit for detecting and collecting the kernel message, in the case that the service determined by the core means is directed to requesting kernel message generated by the kernel of the target system; and a device driver module management unit for installing a device driver transmitted from the host system on a file system of the target system and inserting or deleting the device driver into and from the kernel through a kernel system command, in the case that the service determined by the core means is directed to installation in the target system, start, and end of the device driver module provided on the host system.

Another aspect of the present invention is to a method of operating a driver agent device for supporting a remote device driver development environment in an embedded system, in which a host system having a device driver development tool and a target system having a device driver are separated from each other and interconnected with a communication network, the method including: (a) transferring various services requested from the device driver development tool of the host system to the target system; (b) determining types of the various services transferred to the target system; (c) processing corresponding services based on the types of the various services transferred to the target system; and (d) transmitting results of the services processed in the step (c) to the host system.

BRIEF DESCRIPTION OF THE DRAWINGS

The above and other features of the present invention will be described in reference to certain exemplary embodiments thereof with reference to the attached drawings in which.

DETAILED DESCRIPTION OF PREFERRED EMBODIMENTS

Figure 1:
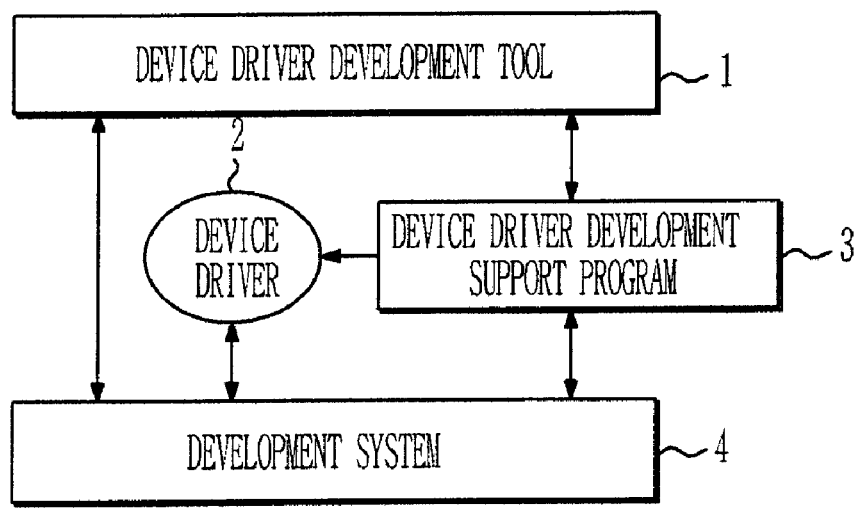
FIG. 1 is a schematic block diagram showing a device driver development environment for a device driver development support program according to the prior art.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
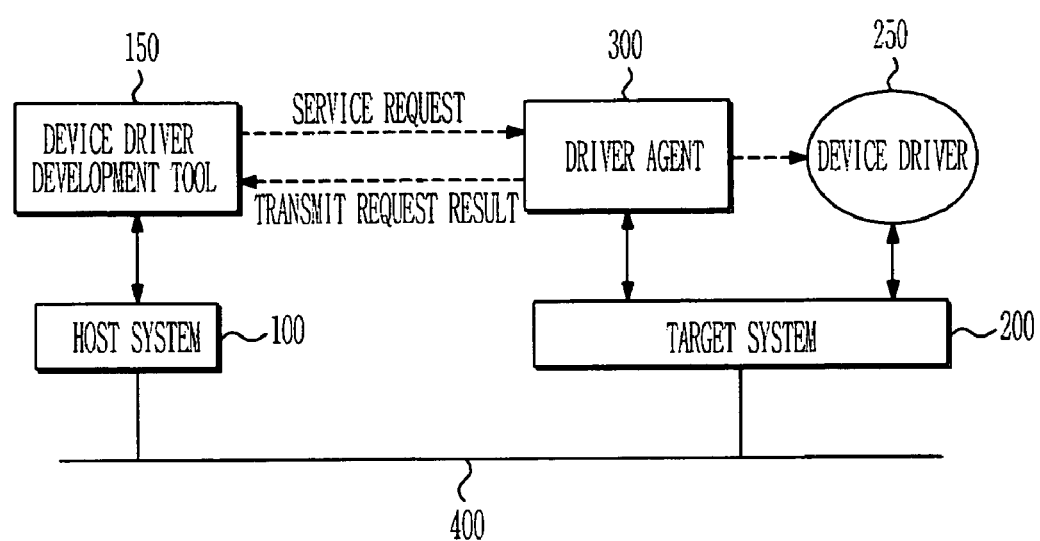
FIG. 2 is a schematic block diagram showing a remote device driver development environment for an embedding system using a driver agent device according to an embodiment of the present invention.
Figure 3:
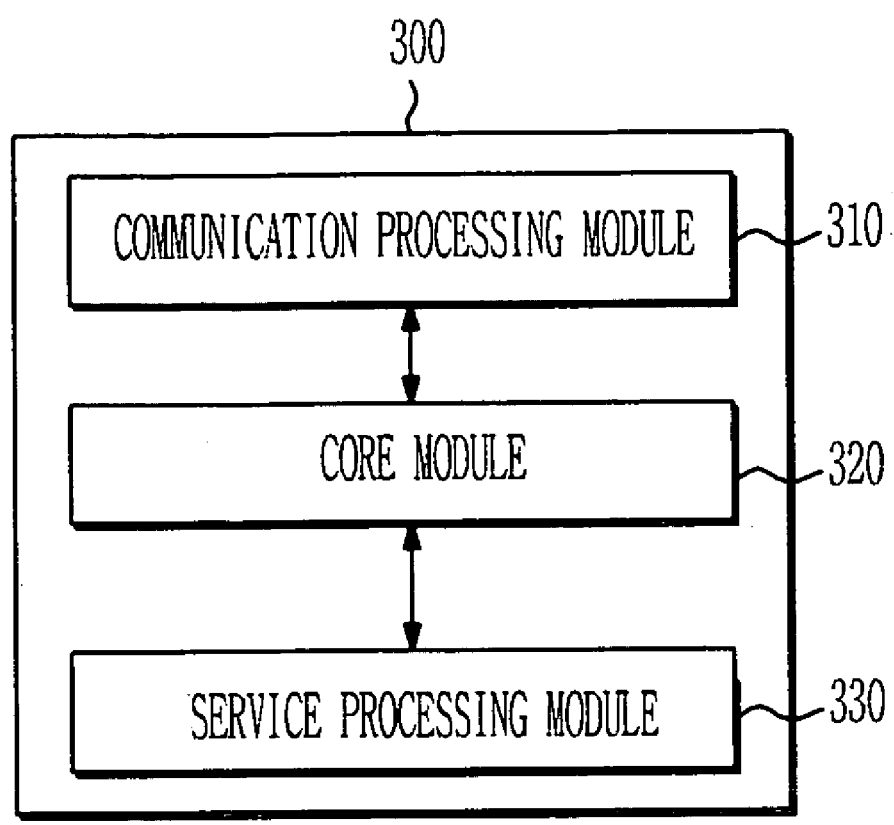
FIG. 3 is a detailed block digram showing the driver agent device of FIG. 2.

FIG. 2 is a schematic block diagram showing a remote device driver development environment for an embedding system using a driver agent device according to an embodiment of the present invention; FIG. 3 is a detailed block digram showing the driver agent device of FIG. 2; and FIG. 4 is a detailed block diagram showing the service processing module of FIG. 3.

Figure 4:
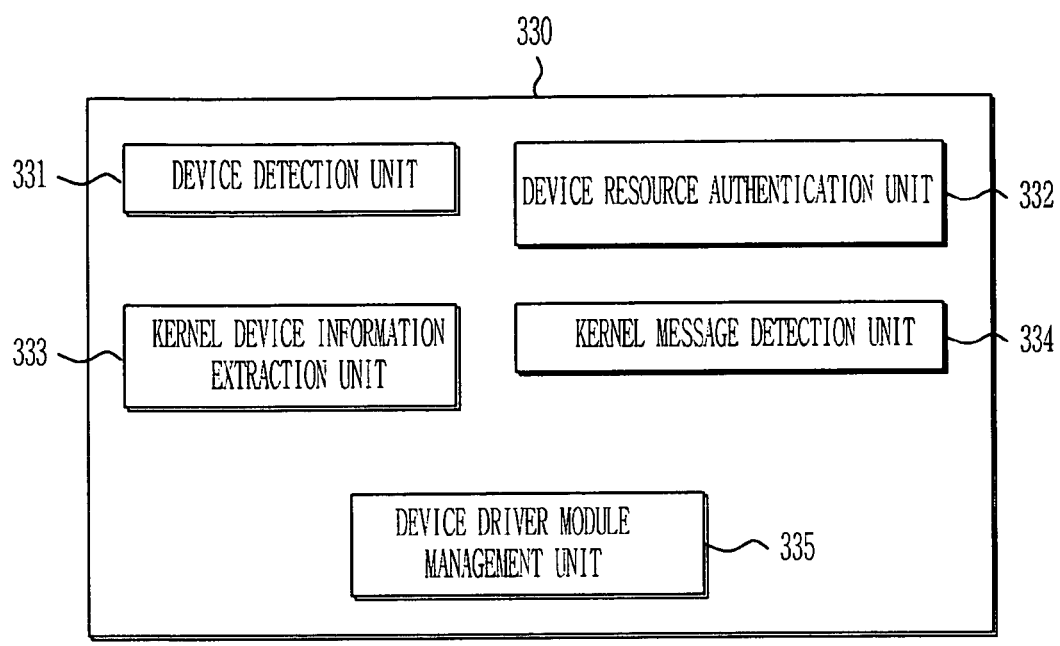
FIG. 4 is a detailed block diagram showing the service processing module of FIG. 3.

As shown in FIGS. 2 to 4, in a remote device driver development environment for an embedded system using a driver agent device according to an embodiment of the present invention, a host system 100 having a device driver development tool 150 and a target system 200 having a device driver 250 are separated and interconnected with a communication network 400.

Here, the communication network 400 is preferably implemented with Ethernet, but the present invention is not limited thereto, and thus it can be implemented with typical various wired/wireless communication networks (e.g., PSTN, ADSL, wireless LAN, BLUETOOTH, CMDA, etc.)

Further, a driver agent device 300 arranged to support the remote device driver development environment in the aforementioned embedded system is interconnected with the target system 200.

The driver agent device 300 includes a communication processing module 310 for receiving and processing various service requests from the device driver development tool 150 of the host system 100 and transmitting the processed services to the host system 100; a core module 320 for determining types of the services requested from the device driver development tool 150 of the host system 100; and a service processing module 330 for performing corresponding services based on the types of the services determined by the core module 320.

In the above configuration, the core module 320 serves to call the corresponding service by processing start and end of the driver agent and determining the type of the host request service transmitted from the communication processing module 310.

In addition, the service processing module 330 includes a device detection unit 331, a device resource authentication unit 332, a kernel device information extraction unit 333, a kernel message detection unit 334, and a device driver module management unit 335.

Here, in the case that the service determined by the core module 320 is directed to detecting the devices mounted on the target system 200, the device detection unit 331 serves to detect device catalog and information by scanning buses of the target system 200.

In the case that the service determined by the core module 320 is directed to authenticating the device resources of the target system 200, the device resource authentication unit 332 serves to provide a read/write access function for the device resources.

In the case that the service determined by the core module 320 is directed to requesting kernel information for the devices of the target system 200, the kernel device information extraction unit 333 serves to extract and collect information retained in a device-related data structure of the kernel.

In the case that the service determined by the core module 320 is directed to requesting a kernel message generated by the kernel of the target system 200, the kernel message detection unit 334 serves to extract and collect the kernel message.

In the case that the service determined by the core module 320 is directed to installation of the device driver module 250 provided by the host system 100 onto the target system 200, and start and end thereof, the device driver module management unit 335 serves to install the device driver 250 transmitted from the host system 100 on a file system (not shown) of the target system 200, and insert or delete the device driver 250 into or from the kernel through a kernel system command.

Next, a method of operating a driver agent device for supporting a remote device driver development environment in an embedded system of the present invention having the aforementioned configuration will be described in detail.

Figure 5:
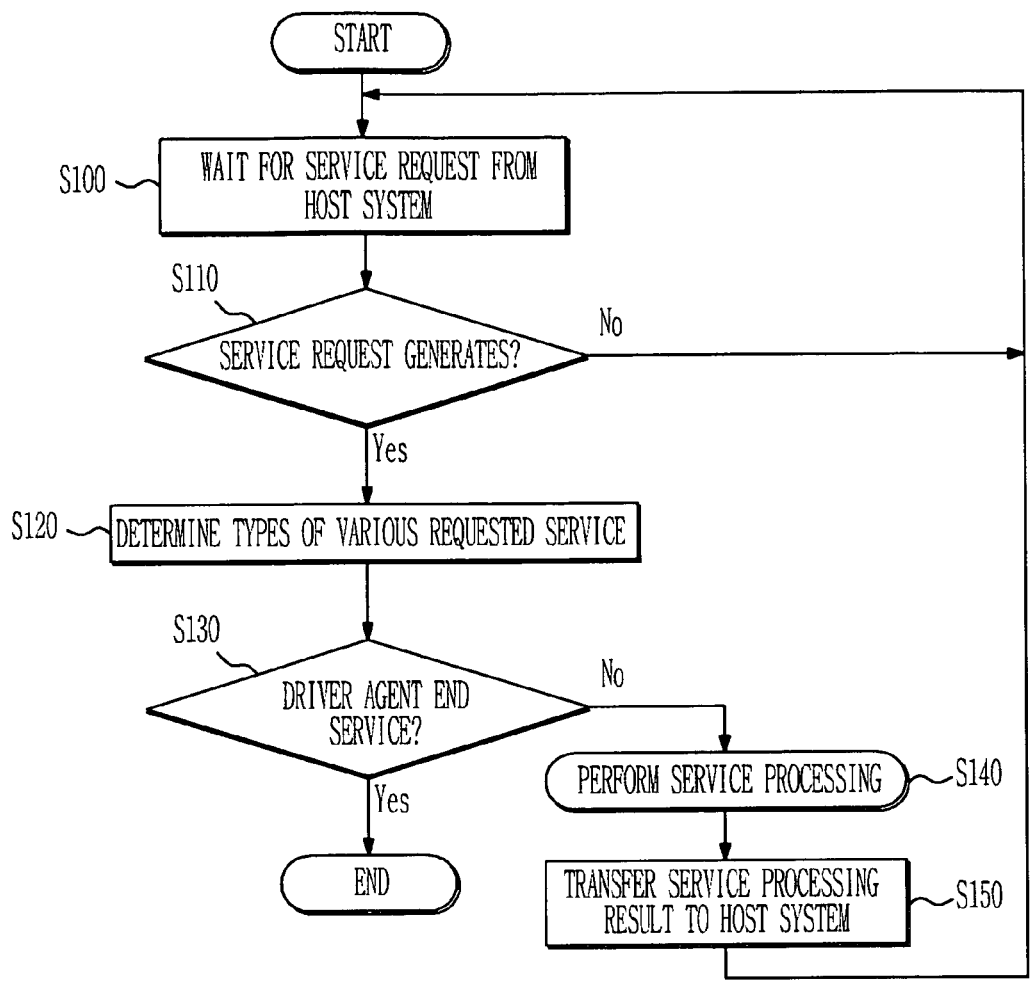
FIG. 5 is a flowchart illustrating an overall operation method for a service request from a host system by a driver agent device according to an embodiment of the present invention.
Figure 6:
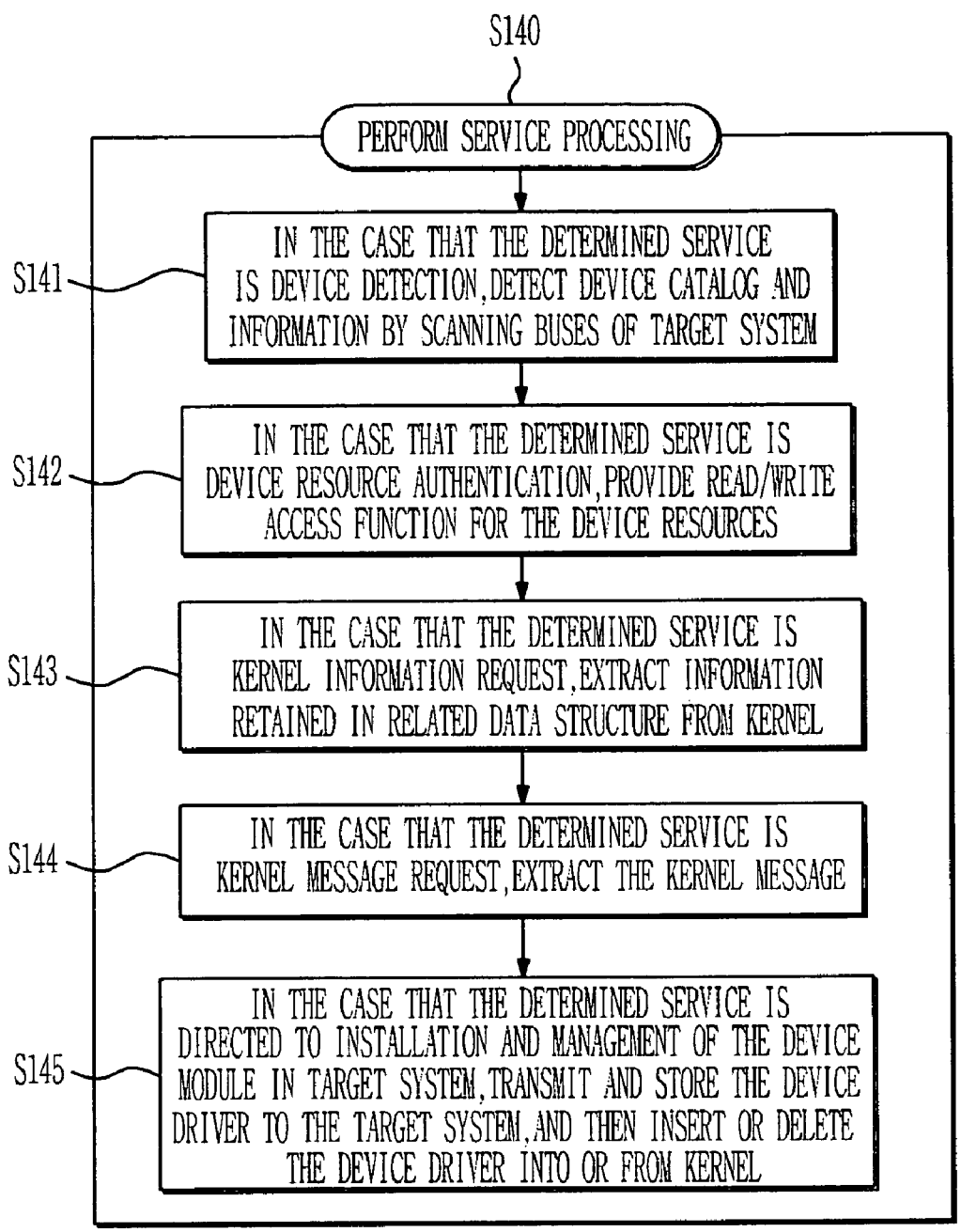
FIG. 6 is a detailed flowchart illustrating the service processing of FIG. 5.

FIG. 5 is a flowchart illustrating an overall operation method for a service request from a host system by a driver agent device according to an embodiment of the present invention; and FIG. 6 is a detailed flowchart illustrating the service processing of FIG. 5. Here, note that the process is mainly operated in the driver agent device 300, unless stated otherwise.

As shown in FIGS. 5 and 6, first, in step 100, the core module 320 performs an initialization operation, and then waits for a service request from a host system 100. Next, in step S110, the communication processing module 310 determines whether or not the service request is generated from the host system 100.

As a result of the determination in step S100, when the service request is not generated from the host system 100, the process returns to step 100, and continues to wait for the service request.

Further, as a result of the determination in step S110, when the service request is generated from the host system 100, in step S120, the communication processing module 310 transfers various services requested from the host system 100 to the core module 320, and the core module 320 determines which service types various services belong to, i.e., the types of the requested various services, and then calls the corresponding service of the service processing module 330.

Next, in step S130, it is determined whether the requested service is an end service of the driver agent. If so, the driver agent is ended.

Further, as a result of the determination in step S130, when the requested service is not the end service of the driver agent, in step S140, the service processing module 330 processes the corresponding service. Next, in step S150, the communication processing module 310 transfers the result of the corresponding service to the host system 100, and the process returns to step S100.

Here, the service processing in step S140 includes: detecting device catalog and information by scanning buses of the target system 200, in the case that the service determined by the core module 320 is directed to detecting the device (step S141); providing a read/write access function for device resources, in the case that the service determined by the core module 320 is directed to authenticating the device resources (step S142); extracting information retained in a related data structure from a kernel, in the case that the service determined by the core module 320 is directed to requesting kernel information on the devices (step S143); detecting a kernel message, in the case that the service determined by the core module 320 is directed to requesting the kernel message (step S144); and transmitting and storing a device driver 250 to the target system 200, and then inserting or deleting the device driver into or from the kernel, in the case that the service determined by the core module 320 is directed to installing and managing the device driver module in the target system (step S145).

The driver agent device for supporting the remote device driver development environment in the embedded system and the operation method thereof as described above are preferably recorded into a recording medium readable with a computer, and processed by the computer.

As described above, according to a driver agent device for supporting a remote device driver development environment in an embedded system of the present invention and an operation method thereof, a driver agents device supports the target system in the development process of a device driver, which is a control program of the device mounted on the embedded system, in the remote host system. Therefore, a device driver developer can effectively process various services such as detecting hardware information needed for the device driver development, resource authentication, and application of the device driver to the target system without expert knowledge on the embedded system. In addition, the device driver developer can also develop the device driver more rapidly and easily and test the device driver by applying it to the target system without a complex procedure. Accordingly, time and manpower required in the device driver development can be effectively reduced.

Although a driver agent device for supporting a remote device driver development environment in an embedded system according to the present invention and an operation method thereof have been described in preferred embodiments of the present invention, the present invention is not limited thereto. However, a variety of modification can be made within the scope of the claims, the detailed description of the invention, and the accompanying drawings, which are also included in the present invention.

What is claimed is:

1. A computer-readable medium comprising a driver agent device for supporting a remote device driver development environment in an embedded system, in which a host system having a device driver development tool and a target system having a device driver are separated from each other and interconnected with a communication network, the driver agent device comprising: instructions which, when executed by a computer, comprisies:

communication processing means interconnected with the target system to receive and process service requests of various types from the device driver development tool of the host system, and to transmit the processed services to the host system through the communication network;

core means for determining the type of service requested from the device driver development tool of the host system; and service processing means for performing corresponding services based on the type of the services determined by the core means;

a device detection unit configured to detect device catalog and information by scanning at least one bus of the target system when the service type is directed to detecting devices mounted on the target system;

a device resource authentication unit configured to provide a read/write access function to the device resources when the service type is directed to authenticating device resources of the target system;

a kernel device information extraction unit configured to extract information retained in a device related data structure of a kernel of the target system, when the service type is directed to requesting kernel information on devices of the target system;

a kernel message detection unit configured to detect and collect a kernel message, when the determined service type is directed to requesting a kernel message generated by the kernel of the target system; and a device driver module management unit configured to: install a device driver, transmitted from the host system, on a file system of the target system; and insert or delete the device driver into/from the kernel of the target system.

2. A method of operating a driver agent device for supporting a remote device driver development environment in an embedded system, in which a host system having a device driver development tool and a target system having a device driver are separated from each other and interconnected with a communication network, the method comprising:

(a) transferring various services requested from the device driver development tool of the host system to the target system;

(b) determining a service type of the service request transferred to the target system;

(c) processing the service request based on the determined service type of the service request transferred to the target system, including:

detecting device catalog and information by scanning at least one bus of the target system when the determined service type is directed to detecting the device;

providing a read/write access function for device resources, when the determined service type is directed to authenticating the device resources;

extracting information retained in a related data structure from a kernel, when the determined service type is directed to requesting kernel information on the devices: and detecting a kernel message, when the determined service tyre is directed to requesting the kernel message;

(d) transmitting results of the service processing in step (c) to the host system;

(e) transmitting a device driver to a file system of the target system; and then (f) inserting the device driver into a kernel of the target system when the service type is directed to installing and managing the device driver in the target system.

3. A comruter-readable medium comrrising a driver agent device for supporting a remote device driver development environment in an embedded system, in which a host system having a device driver development tool and a target system having a device driver are separated from each other and interconnected with a communication network, the driver agent device comprising instructions which, when executed by a computer, comprise:

communication processing means interconnecting a host system with a target system, the communication processing means configured to receive and process service requests of various types from a device driver development tool of a host system and to transmit the processed service requests to the host system through a communication network;

core means for determining the type of service requested from the device driver development tool; and service processing means for performing services on the target system based on the type of service requested, the service processing means comprising a device driver module management unit configured to:
install a device driver, transmitted from the host system, on a file system of the target system; and
insert the device driver into the kernel of the target systems;

wherein the service rrocessing means further comprises:
a device detection unit configured to detect device catalog and information by scanning at least one bus of the target system when the service type is directed to detecting devices mounted on the target system.

4. The driver agent device according to claim 3, wherein the service processing means further comprises:
a device resource authentication unit configured to provide a read/write access function to the device resources when the service type is directed to authenticating device resources of the target system.

5. The driver agent device according to claim 3, wherein the service processing means further comprises:
a kernel device information extraction unit configured to extract information retained in a device related data structure of a kernel of the target system, when the service type is directed to requesting kernel information on devices of the target system; and
a kernel message detection unit configured to detect and collect a kernel message, when the determined service type is directed to requesting a kernel message generated by the kernel of the target system.

* * * * *